ELECTRONIC DIFFERENTIAL COMPUTER

| | | | | | |
|---|---|---|---|---|---|
| $R_1$ | 15K | $R_{12}, R_{13}, R_{22}, R_{23}, R_{42}, R_{43}$ | 82K | $C_2$ | 47μμf |
| $R_2$ | 2.2MEG | $R_{14}, R_{15}, R_{24}, R_{25}, R_{44}, R_{45}$ | 470K | $C_{10}, C_{13}, C_{20}, C_{21}, C_{22}, C_{40}$ | 220μμf |
| $R_3$ | 2.7MEG | $R_{16}, R_{17}, R_{26}, R_{27}, R_{46}, R_{47}$ | 270K | $C_{11}, C_{12}, C_{41}, C_{42}$ | 68μμf |
| $R_4$ | 100K | $R_{18}, R_{28}, R_{48}$ | 56K | $C_{23}$ | 330μμf |
| $R_{11}, R_{21}, R_{41}$ | 220K | $C_1$ | .01μfd | $C_{43}$ | 33μμf |

Maurice DeMong
INVENTOR.

BY G. D. O'Brien
W. O. Quesenberry
ATTORNEYS

Maurice De Mong
INVENTOR.
BY G. D. O'Brien
W. O. Quesenberry
ATTORNEYS 3,011,705

ELECTRONIC DIFFERENTIAL COMPUTER

Maurice D. De Mong, Torrance, Calif., assignor, by mesne assignments, to the United States of America as represented by the Secretary of the Navy Filed Jan. 19, 1956, Ser. No. 560,269
3 Claims. (Cl. 235—92)

This invention relates to an electronic differential computer having a pair of separate inputs and which is capable of indicating at all times the difference between the number of pulses applied to the individual input terminals.

Electronic binary computers which are capable of performing this general result are already known in the computer art. For example, it is known to provide electronic computers in which when one type of pulse is applied the counter will step forward one count while, when the other type of pulse is applied the counter will step forward a number of counts equal to the complement of a single pulse, with the result that the actual reading in the counter will be one less than its previous reading. However, such computers as have heretofore been known have required a relatively large number of components and have had the disadvantage that the counting speed, at least so far as regards one of the inputs, has been unduly slow.

It is an object of this invention to provide a binary computer of the differential type which utilizes a minimum of components, is relatively simple to construct, and which provides for relatively rapid counting speeds. While this computer utilizes the principle of adding complements of a number to effectively subtract that number, instead of counting by ones or the complement of one, it is so arranged that a single pulse applied to one input of an N-stage computer will cause the count in the computer to advance $2^{N-1}-1$ units while a single pulse applied to the other input will cause the count to advance $2^{N-1}+1$ units. Thus, in a three stage computer a pulse applied to the Add input will cause the computer to advance three counts while one applied to the Subtract input will cause the computer to advance five counts. It should be noted that in a binary computer having three stages the number 5 is the complement of the number 3. This result is obtained by causing the Add input pulses to trigger all stages of the computer except the last stage while Subtract pulses are caused to trigger only the first and last stages of the computer. In order to avoid pulse coincidence at certain times a simple time delay tube is interposed in the carry-over connections between each pair of successive stages except the last stage. Thus, in a three-stage computer the Add input will be connected to the first and second stages, the Subtract input will be connected to the first and third stages, and a time delay tube will be provided in the carry connection between the first and second stages.

The principle of operation of the invention, further objects and advantages thereof, and the preferred mode for practicing the invention will become apparent from the following specification and claims, especially when considered in the light of the accompanying drawing in which:

Figures 1, 2:
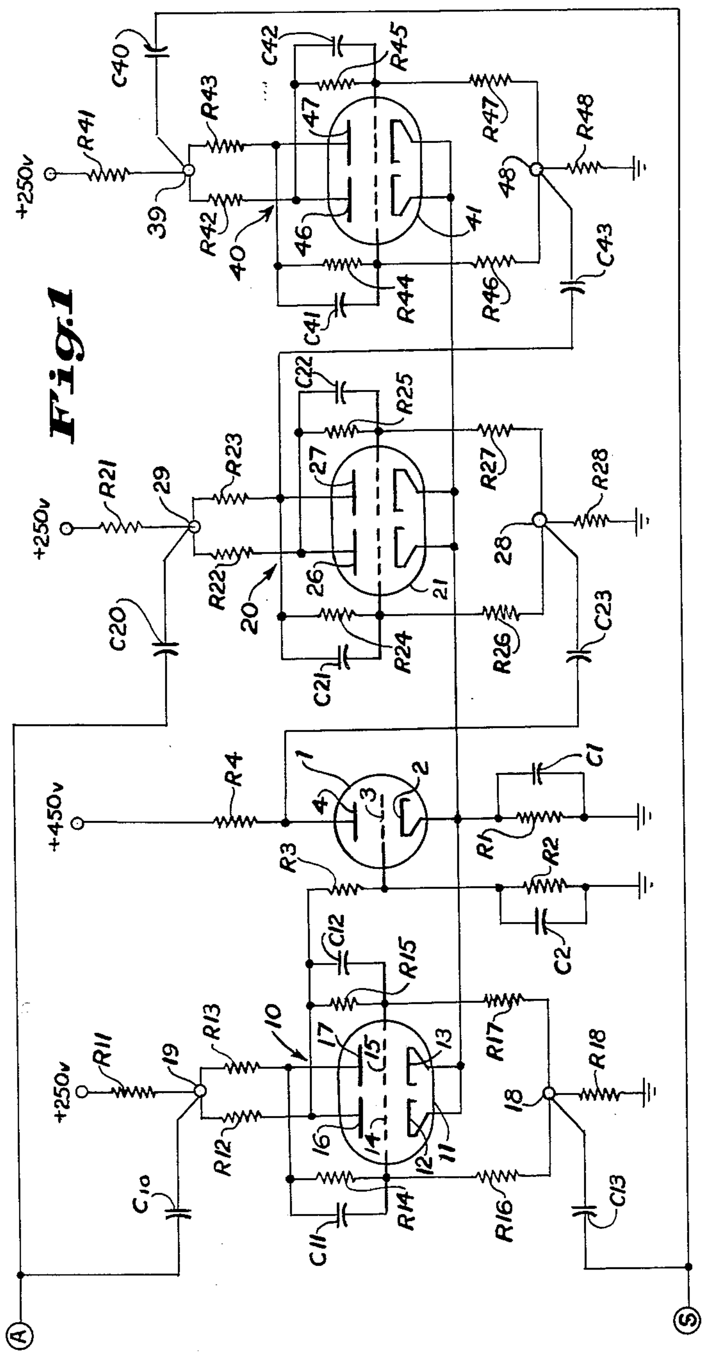
FIG. 1 is a schematic diagram of a three-stage computer according to the invention.
FIG. 2 is a table showing representative values of the components utilized in the computer of FIG. 1.

There is shown in FIG. 1, a three-stage electronic binary computer including three flip-flop, or bi-stable multivibrator stages 10, 20 and 40. As in the usual binary computer the first stage 10, when in one condition of operation represents the decimal number 1 while, in the other condition it represents the number 0. The second stage 20, depending upon its state at any particular time, will represent the number 2 or 0, while the third stage 40 will represent the number 4 or 0, as the case may be. Each of these stages is essentially similar to the others and a description of stage 10 will suffice for all.

Figure 4:
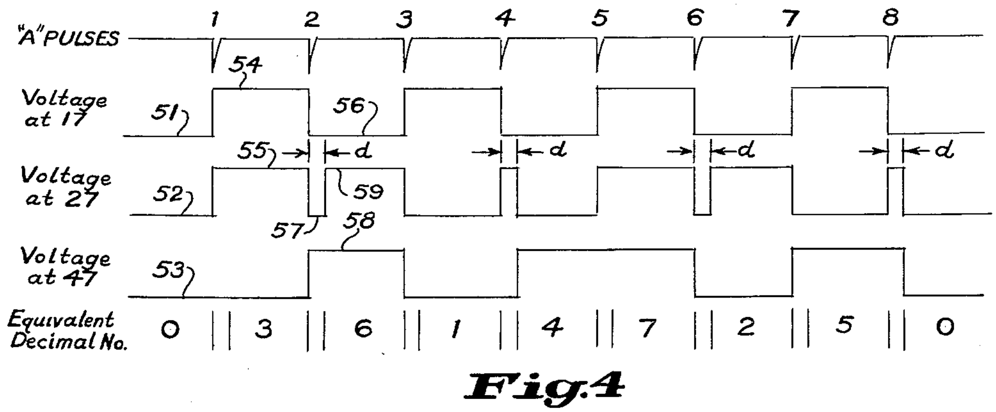
FIG. 4 is a graph showing the voltage wave-forms which obtain at various designated points in the computer of FIG. 1 when a series of pulses are applied to the Add input terminal.
Figure 5:
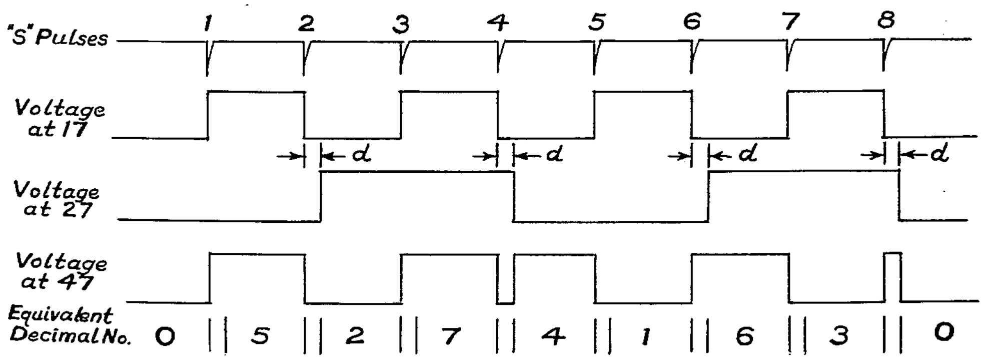
FIG. 5 is a similar graph showing the effect of pulses applied to the Subtract input terminal.

Thus, stage 10 comprises a duo-triode 11 which, for example, may be a type 12AT7 vacuum tube having a pair of cathodes 12 and 13, a pair of grids 14, 15 and a pair of anodes or plates 16 and 17. Plate voltage is applied to the anodes 16 and 17 through a common plate resistor R11 and individual plate resistors $R_{12}$ and $R_{13}$. Both cathodes 12 and 13 are connected together and, in parallel with the cathodes of all of the other stages of the computer, are connected to ground through a cathode-biasing resistor $R_1$ provided with a suitable by-pass condenser C1. The grids 14 and 15 are connected through their individual grid resistors $R_{16}$ and $R_{17}$ to one end of a common grid resistor $R_{18}$, the other end of which is grounded. As is usual in such flip-flop stages, feedback from the right hand plate 17 to the left hand grid 14 is provided by means of a resistor R14 and associated condenser C11, while a corresponding feedback path is provided from the left hand plate 16 to the right hand grid 15 by means of resistor $R_{15}$ and condenser C12. As is well known, such a stage has two stable states, during one of which one triode section will be conductive while the other will be non-conducting, and vice versa. However, when a negative-going pulse is applied at an appropriate point to either the grid or plate circuit of such a stage, the formerly non-conducting section will become conductive and the formerly conductive section will become non-conductive, the stage remaining in this new condition until the next triggering pulse is received. In the instant case two separate inputs 18 and 19 are provided, the grid input terminal 18 being located at the junction of resistors R16, R17 and R18 and the corresponding plate input 19 being located at the junction of resistors R11, R12 and R13. A negative pulse applied to either of these input terminals will cause the particular stage to change its state. In order to identify the two states of such a flip-flop stage it is common to refer to one condition as the "0" state and the other one as the "1" state. In the computer under discussion each stage will be considered to be in its "0" condition when its right hand triode section is conducting. As can be seen in FIGS. 4 and 5 the voltage at its right hand anode will at that time be relatively low while, when the tube is in its "1" state the voltage on this same plate will be at a maximum.

Pulses which are to be effectively added, and which will appear as negative-going pulses, are applied to the Add input terminal A. As is indicated in FIG. 1 this terminal is connected through condenser C10 to the input terminal 19 of stage 10 and, through condenser C20 to the corresponding input terminal 29 of stage 20. A second or Subtract pulse input terminal S is provided, to which pulses which are to be effectively subtracted are applied, also in the form of negative-going pulses, these Subtract pulses being applied through condenser C13 to the other input terminal 18 of the first stage and through condenser C40 to the terminal 39 of the last stage. Thus, each pulse applied to the Add terminal A will cause both the first and second stages to change their state while each pulse applied to Subtract terminal S will cause the first and last stages to change their state. It should be mentioned at this time that, while the pulses applied to the input terminals A and S may occur in somewhat random fashion, it is not contemplated that an Add and a Subtract pulse should be applied to their respective input terminals at the same instant.

Figure 6:
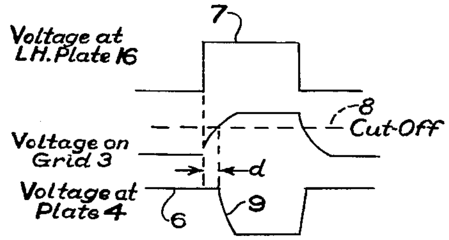
FIG. 6 is a graph which shows, by means of voltage wave forms, the manner in which the delay tube provides the required time delay.

As in any multi-stage binary computer it is necessary to provide suitable carry-over connections between successive stages so that each second change of state in any particular stage will cause a corresponding change in state of the next succeeding stage. In the usual binary computer this carry conection may conveniently be similar to that illustrated between stages 20 and 40 wherein the sudden drop in voltage appearing at the right hand plate 27 of stage 20, when this stage changes from its "1" to its "0" state, is applied through a condenser C43 to the input terminal 48 to trigger stage 40. However, where, as in the present case, both the first and second stages will, for example, be triggered simultaneously by a pulse applied to terminal A, it is necessary to provide that triggering of the second stage by a carry pulse from the first stage be delayed somewhat so that it will not coincide with the pulse appearing at the input terminal 29. To this end a suitable time delay means is included in the carry connection from stage 10 to stage 20. This delay means comprises a triode 1 (such as a tube type 6AV6) which has its cathode 2 connected, like the other stages, through resistor $R_1$ to ground and its anode 4 connected through a plate resistor $R_4$ to a source of high potential 5. A voltage divider formed by resistors $R_2$ and $R_3$, connected between ground and the left hand anode 16 of tube 11, serves to apply a positive bias voltage to the grid 3. The arrangement is such that, when the left hand section of tube 11 is conducting (that is, when stage 10 is in the "1" state) the positive voltage on the grid 3 will, however, be considerably lower than the positive voltage appearing on the cathode 2 due to the drop through the common cathode resistor $R_1$. Under these conditions tube 1 will be completely cut off and the voltage on its anode 4 will be relatively high as shown at 6 in FIG. 6. However, upon the application of the next input pulse to tube 11, tube 11 will switch from its "1" to its "0" state and the voltage on the left hand anode 16 will rise abruptly to a relatively high value as indicated at 7 in FIG. 6. This voltage will tend to cause a corresponding increase in voltage applied to the grid 3 of tube 1. However, resistor R2 is shunted by a condenser C2 so that the voltage on the grid 3, rather than rising instantaneously, will rise somewhat gradually in accordance with the charging rate of the condenser C2. The component values are so selected that the voltage on grid 3 will not rise to the cut-off level indicated by the dotted line 8 in FIG. 6 until the end of a short delay period, indicated at *d* in FIG. 6. As soon as the cut-off value has been passed, plate current will begin to flow in tube 1 causing a relatively rapid drop in plate voltage, as indicated at 9 in FIG. 6. This drop in voltage is applied through condenser C23 to the grid input terminal 28 of stage 20 and will thereupon cause a triggering of this stage. Thus the trigger pulses from stage 10 will be delayed by a short time interval *d* so that they will not occur simultaneously with a pulse applied directly to the other input terminal 29.

The manner in which the computer of FIG. 1 operates will be best understood from a study of FIGS. 4 and 5, which show the voltage wave forms which exist at various points as a series of pulses are applied to the computer input terminals. Thus, at the top of FIG. 4 a series of eight "Add" pulses applied to the A input terminal are graphically illustrated. It is assumed that, prior to the reception of the first A pulse the computer is in its zero or reset condition in which the right hand section of each of the tubes 11, 21 and 41 is conducting. Under these conditions the voltages at the right hand plates of these tubes will be, as indicated at 51, 52 and 53 respectively, at their lowermost values. When the first A pulse arrives at the input terminals 19 and 29 of the first and second stages respectively each of these stages will be triggered and will change over to its "1" state as indicated by the higher voltages at 54 and 55 in FIG. 4. The last stage will remain in its "0" stage. Upon the application of the second pulse to the A terminal the first and second stages will again be triggered and will revert to their "0" condition as indicated at 56 and 57. Substantially simultaneously the resulting drop in potential of the right hand plate 27 of the second stage will produce a carry triggering pulse through the condenser C–43 to the input 48 of the last stage causing this latter stage to change from its "0" to its "1" condition as indicated at 58. Meanwhile, as previously described, at the instant that the first stage changes from its "1" to its "0" state, the voltage on the left hand plate 16 of the first stage rises abruptly to signal the beginning of a time delay interval. At the expiration of this time delay, indicated by the interval *d*, a negative-going pulse from the plate 4 of delay tube 1 will be applied through condenser C23 to the input terminal 28 of the second stage 20, causing this stage to again return to its "1" condition as indicated at 59.

The condition of the individual stages at each instant during the series of eight impulses to the input terminal A is clearly shown in FIG. 4 and, from this figure, it will be noted that the first and second stages will reverse their condition after each input pulse but that, at the expiration of the time delay period following each second input pulse, the second stage will again return to its previous condition. Similarly each time the second stage changes from its "1" to its "0" stage, the last stage will be reversed. Thus, after the first input pulse to the terminal A, the computer will indicate the binary number 011 which is the equivalent of the decimal number 3. After the second A pulse (and after the elapse of the short carry-delay interval) the computer will indicate the binary number 110, which is equivalent to the decimal number 6. The next A pulse will cause the counter to advance three more units but, since there is no stage after the third, the pulse which would normally be carried over to the next succeeding stage is lost and the actual reading remaining in the computer stages will be the binary number 001 corresponding to the decimal number 1. The decimal number equivalent of the binary number standing in the computer after any given number of successive A pulses is indicated in the lower portion of FIG. 4.

Turning now to FIG. 5 the corresponding voltage wave forms which will obtain as a result of a series of pulses applied to the Subtract input terminal S are shown. From this figure it will be seen that the count advances by 5 but that, since the carry pulses from the last stage are again lost, the series of decimal numbers actually indicated by the computer will be as indicated at the bottom of this figure. A comparison of FIGS. 4 and 5 shows that the series of numbers shown at the bottom of FIG. 5 are in a reverse order from those shown in FIG. 4 which resulted from the application of pulses to the A terminal. From the above it can be seen that A pulses will cause the computer to count in one direction through the series of numerals indicated at the bottom of FIG. 4 while S pulses will cause it to count in the opposite direction through this same series and that, at any particular time, the actual reading of the computer will be a unique indication of the difference between the number of A pulses and B pulses which have been applied up to that time. Thus, assume that a series of three A pulses is followed by two B pulses and then another A pulse.

The computer, which is assumed to be starting from its zero condition will successively indicate the numerals 3, 6 and 1 as the three A pulses are applied. However, the next two pulses are Subtract pulses and, as shown by FIG. 5, an S pulse applied to the computer when it is indicating the numeral 1 (corresponding to three A pulses) will cause it to change to 6 while the next S pulse will cause it to shift to indicate the numeral 3. The next pulse, which is an A pulse, will once more advance the computer to read 6. FIG. 4 shows that the final computer reading of 6 corresponds to two A pulses, which is the actual number by which the number of A pulses exceeded the number of S pulses in the assumed example.

While a computer of the type described is obviously capable of a wide range of applications, it is especially well adapted for use when, for example, it is desired to perform some control function whenever the number of pulses applied to either input terminal exceeds, by a predetermined number, those applied to the other input terminal. Thus, assume that it is desired to energize a first control relay whenever the A pulses exceed the S pulses by three and to energize a separate control relay whenever the S pulses exceed the A pulses by three.

A study of FIGS. 4 and 5 shows that whenever the first of these conditions exists the first stage will be in its "1" state while the second and third stages will be in their "0" states, corresponding to the binary number 001 (or decimal number 1). Under this condition the voltage on the right hand plate 17 of tube 11 and the voltage on the left hand plates 26 and 46 of tubes 21 and 41 respectively will be at the maximum value. Any arrangement capable of detecting this voltage distribution (which is unique to the binary 001 condition) may therefore be utilized for initiating the operation of the desired control relay.

While many devices capable of performing such a function are known to those skilled in the art, a detecting circuit which is well adapted for this purpose is that shown and described in the copending application of Dwight D. Wilcox, Jr., Serial No. 258,371, and which utilizes a triode tube, in the plate circuit of which is the desired control relay. As clearly set forth therein, the grid of this detecting tube is connected by individual high value resistors to that plate of each counter stage which will be most positive when the desired condition obtains. In the assumed example, these individual resistors for the first detecting means would therefore be connected to the plates 17, 26 and 46. As is clearly described in the above-mentioned Wilcox application, the detecting tube is so biased that it will only conduct sufficiently to energize the control relay when all three of these plates are simultaneously at the higher potential.

A similar detector could also be utilized for actuating the second control relay whenever the binary number 111 (or decimal number 7) stands in the computer, in this case the individual resistors of the detector being connected to the right hand plates 17, 27 and 47, which would also be most positive when, and only when, this condition obtains.

It should be noted that during certain of the delay intervals the computer will briefly indicate a false number. However these false indications are of such short duration that they present no problem in practice. The inherent time lag of the relay used in any detecting device which might be associated with such a computer will normally considerably exceed the time duration of such transient indications and these transients will therefore be ineffective to actuate the detecting means.

Figure 3:
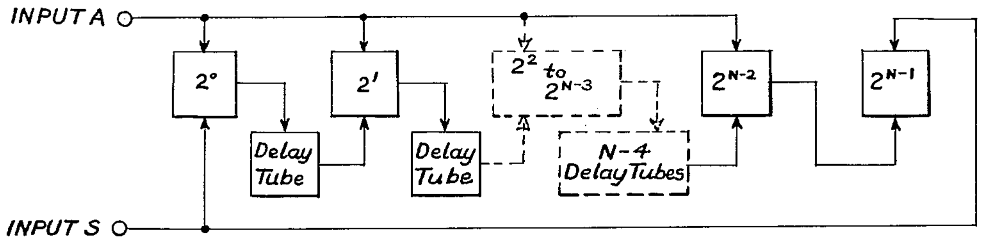
FIG. 3 is a block diagram showing how the invention can be applied to a computer of any desired number of stages.

While, to avoid unnecessary confusion, the invention has been described as applied to a computer having only three stages, it is equally applicable to a computer of any desired number of stages. The manner in which the invention should be applied to a computer of any given number of stages, is indicated in FIG. 3, wherein N represents the number of stages in the computer. For example in a 5-stage computer, which is capable of indicating $2^5$ (or 32) distinct states, the Add input A would be applied to one input terminal of each of the first four stages while the subtract input would be applied to the other input terminal of the first stage and to one input terminal of the last stage. Carry connections would be provided between each successive pair of stages, with a delay tube interposed in the carry connections between each successive pair of stages except the last pair. Obviously the safe counting speed of a 5-stage computer would necessarily be somewhat slower than that for the 3-stage computer shown in FIG. 1 since, under certain conditions, the delay intervals produced by the three delay tubes would be cumulative.

From the above it can be seen that a computer constructed according to the invention can definitely indicate any of a series of $2^N$ distinct numbers or conditions, wherein N corresponds to the number of stages in the computer, and that a series of pulses applied to one input terminal will cause it to advance in a predetermined sequence through this series, while a series of pulses applied to the other input terminal will cause it to advance in the reverse sequence through the series. Therefore at any particular instant the actual number standing in the computer will be a positive indication of the difference between the number of pulses applied to the respective terminals. The computer utilizes a minimum of components, each of which is readily available, and is free from any objectionable "sneak" circuits which might cause erroneous counting or indication. While specific tube types and values of components have been disclosed, this is for illustrative purposes only, and it is obvious that many changes can be made without departing from the spirit and scope of the invention as defined by the appended claims.

I claim:

1. A differential electronic computer comprising a series of bi-stable electronic binary counting stages having carry connections between succeeding stages in said series, a pair of computer pulse input terminals, means connecting one of said input terminals to each of said stages except the last whereby each pulse applied to said one terminal will simultaneously cause each of the stages connected thereto to change from one stable state to the other, means connecting the other of said input terminals to the first and last stages only of said series whereby each pulse applied to said other terminal will simultaneously cause said first and last stages to change from one stable state to the other, and electrical delay means interposed in certain of said carry connections whereby to prevent the simultaneous arrival at any stage of a pulse from either input terminal and a carry pulse through the carry connection from the preceding stage.

2. A differential electronic computer comprising a series of pulse-responsive bi-stable electronic binary counting stages, a pair of computer input terminals, input pulse transmitting connections from one of said input terminals to each of said stages except the last, input pulse transmitting connections from the other of said input terminals to the first and last stages only of said series, and carry pulse transmitting connections between each successive pair of stages in said series, each of said stages being responsive to a pulse arriving thereat over any of said connections to change from one stable state to the other and responsive to each second change of state to transmit a carry pulse through the carry pulse transmitting connection to the next succeeding stage, and time delay means interposed in certain of said pulse transmitting connections to prevent the simultaneous arrival at any stage of an input pulse from one of said input terminals and a carry pulse from the preceding stage.

3. A differential electronic computer comprising a series of bi-stable electronic binary counting stages each having first and second electrically isolated count input terminals and a carry pulse output terminal, an Add input terminal connected to one count input terminal of each of said stages except the last, a Subtract input terminal connected to one count input terminal of the last stage and to the other count input terminal of the first stage, carry connections from the output of each stage to the other input of the immediately succeeding stage and individual time delay means interposed in the carry connections between each successive pair of stages except the last pair of said series.

References Cited in the file of this patent

UNITED STATES PATENTS

| | | |
|---|---|---|
| 2,435,840 | Morton | Feb. 10, 1948 |
| 2,580,771 | Harper | Jan. 1, 1952 |
| 2,615,127 | Edwards | Oct. 21, 1952 |
| 2,700,503 | Crosman | Jan. 25, 1955 |
| 2,821,696 | Shiowitz et al. | Jan. 28, 1958 |